July 2, 1940.  G. A. ADAMS  2,206,383

WATERING TRAY FOR CAGES

Filed June 27, 1939

Inventor.
Geo. A. Adams
by L. B. Harriman
Atty

Patented July 2, 1940

2,206,383

UNITED STATES PATENT OFFICE 2,206,383

WATERING TRAY FOR CAGES

George A. Adams, Seabrook, N. H.

Application June 27, 1939, Serial No. 281,345

3 Claims. (Cl. 119—18)

This invention relates to certain improvements in cages for animals, birds and reptiles, and more particularly to means for supplying water thereto.

The objects of my invention are to provide a construction of cage in connection with a watering tray therefor which is so arranged that the tray may be readily filled or kept supplied with water without opening any portion of the cage, and which also permits ready removal of the tray from the cage for cleaning or other purposes and return thereto without opening the cage, so that the occupants of the cage will have no opportunity to escape.

I accomplish these objects by providing the cage with an opening in one of the side walls thereof, which is constantly closed against egress by a metal plate secured to the wall in position to depend in front of said opening and by providing a watering tray which is adapted to be inserted in said opening, between the edges of the plate and the edges of the opening, said plate being loosely fitted to the interior of the tray to permit water to pass from end to end of the tray.

For a more complete disclosure of my invention reference is now made to the following specification, in connection with the accompanying drawing, in which.

In the embodiment of my invention shown in Figs. 1 to 4, the side walls 10 of the cage are shown as consisting of material of substantial thickness, as wood, in which a rectangular-shaped opening 11 is formed at any suitable point and providing a sill 10' of substantial width at the bottom of the opening.

Figure 2:
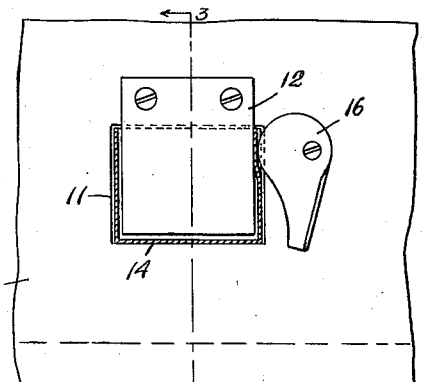
Fig. 2 is a sectional view at line 2—2 of Fig. 1.
Figure 3:
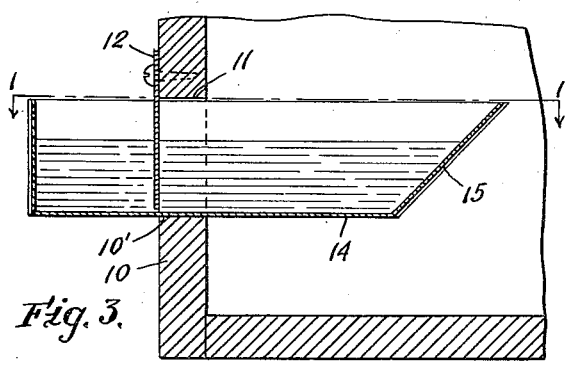
Fig. 3 is a sectional view at line 3—3 of Fig. 2.

According to my invention a plate 12 of stiff sheet metal is secured to the outer side of the wall directly above the opening, so that it depends in front of the opening and almost completely closes the same, except that a narrow space is provided between the side and bottom edges of the plate and each side and bottom of the opening, as shown in Fig. 2, the lower end of the plate being located directly over the outer edge of the sill.

Figure 1:
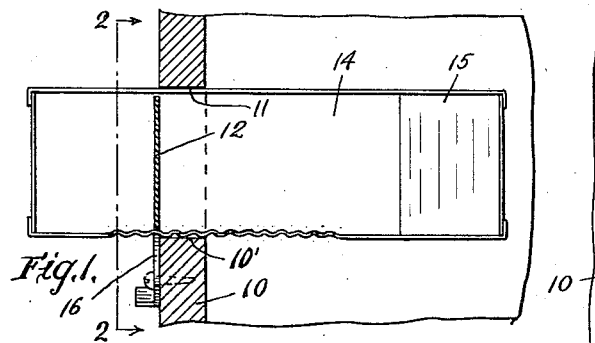
Fig. 1 is a sectional plan view at line 1—1 of Fig. 3.
Figure 4:
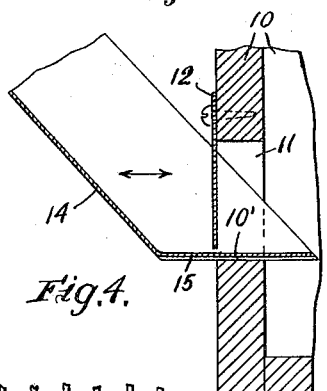
Fig. 4 is a similar view illustrating the method of inserting and removing the tray.

I further provide a somewhat elongated sheet metal watering tray 14, having parallel sides, said tray being open at the top and the sides and bottom of which are shaped to correspond to the space between the side and bottom edges of the opening 11 and the side and bottom edges of the plate 12, the tray being slidably fitted externally to the opening 11 and loosely fitted internally to the edges of the plate 12, so that the tray may be passed into the opening 11 with the plate 12 depending therein. The inner end wall 15 of the tray is preferably inclined to the bottom thereof, the opposite end wall being perpendicular thereto, so that when the tray is to be placed in position in the opening, it may be held in an inclined position, and the top edge of its inner end wall may be inserted in the space between the edges of the plate and the sill at the bottom of the opening, as indicated in Fig. 4, and then it may be moved to a horizontal position and pushed through the opening, on the sill, into the position shown in Figs. 1 and 2. As the edges of plate 12 are loosely fitted to the interior of the tray, water will pass freely from end to end thereof, so that the tray may be filled after it has been placed in position, and a uniform water level will be maintained therein. The bottom end of plate 12 is held close to the bottom of the tray over the outer edge of the sill and assists in holding the tray in a horizontal position when weight is applied to its inner end. A cam lock 16 may be provided on the outer side of the cage for engaging the side of the tray and securely holding it in any position to which it may be adjusted. The side of the tray may be corrugated, as shown in Fig. 1, to provide grooves in which the lock 16 may be engaged, but a lock for the tray is ordinarily unnecesary.

The obliquely inclined end wall of the tray is not essential as the tray may be inserted if both ends are perpendicular to the bottom, but it enables the tray to be more conveniently inserted.

Figure 5:
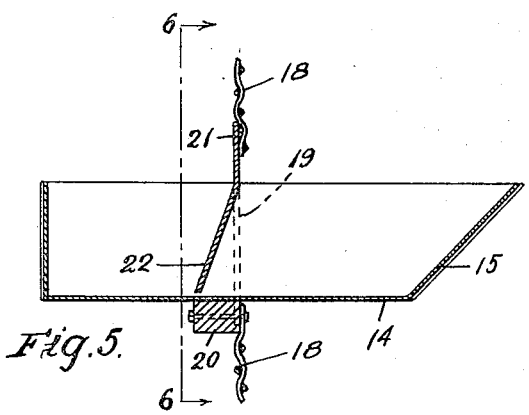
Fig. 5 is a sectional view on a line corresponding to line 3—3, illustrating the application to a cage formed by a screen.
Figure 6:
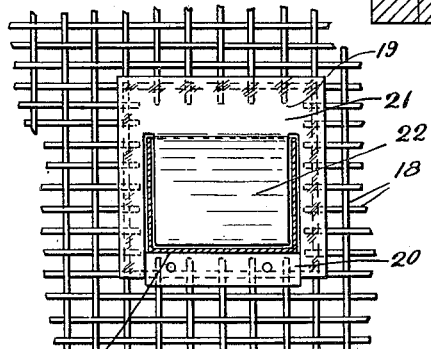
Fig. 6 is a sectional view at line 6—6 of Fig. 5.

In Figs. 5 and 6 an application of my invention to a wire screen is illustrated. In this instance the screen 18 is provided with an opening 19 and a wooden sill 20 of substantial width is secured thereto, by any suitable means, at the level of the bottom edge of the opening. A sheet metal frame 21, which is shaped to enclose the top and sides of the opening 19, is secured to the screen about the opening and has a tongue portion 22, which corresponds to the plate 12, extending from the top portion thereof, a space being provided between the side edges of the tongue portion and the sides of the frame, which corresponds to the space between the plate 12 and opening 11. The tongue portion 22 preferably extends obliquely to a point directly above the outer edge of the sill 20, as shown in Fig. 5. The tray 14, which is employed, is exactly the same, and is inserted in position in the same way as already disclosed. The object of having the tongue 22 extend obliquely to the edge of the sill is to enable the tongue to prevent the tray from tilting when weight is applied to its inner end. As in the previously described construction the tongue 22 is loosely fitted to the interior of the tray so that water will be free to flow from one end of the tray to the other.

I claim:

1. In combination with a cage having an opening in a side wall thereof, a stiff sheet metal plate rigidly secured to said wall in position to depend in front of said opening and substantially close passageway therethru, and a watering tray consisting of an elongated receptacle slidably fitted externally to said opening and loosely fitted internally to the edges of said plate, to permit one end portion of the tray to be inserted in the cage and to permit water placed in the outer portion of the tray to flow past the plate to the inner portion thereof.

2. In combination with a cage having an opening in a side wall thereof, a sill of substantial width at the bottom of said opening, an elongated watering tray slidable on said sill within said opening and a plate depending in front of said opening and rigidly supported in position constantly to close the same against egress, the side and bottom edges of said plate being loosely fitted to the interior of said tray to permit liquid to pass from end to end of the tray while in position in the opening.

3. In combination with a cage having an opening in a side wall thereof, a sill of substantial width at the bottom of said opening, an elongated watering tray slidable on said sill within said opening and a plate depending in front of said opening and rigidly supported in position constantly to close the same against egress, the side and bottom edges of said plate being loosely fitted to the interior of said tray, and the lower end of said plate being located directly over the outer edge of the sill.

GEORGE A. ADAMS.